US010255045B2

(12) United States Patent
Drukman et al.

(10) Patent No.: US 10,255,045 B2
(45) Date of Patent: Apr. 9, 2019

(54) GRAPHICAL REPRESENTATION OF DATA IN A PROGRAM CODE EDITOR

(71) Applicant: Apple Inc., Cupertino, CA (US)

(72) Inventors: Max Drukman, San Francisco, CA (US); Kenneth S. Orr, Morgan Hill, CA (US); Sam Page, San Francisco, CA (US); Behzad Aghaei, Santa Clara, CA (US); Chris Lattner, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 15/066,539

(22) Filed: Mar. 10, 2016

(65) Prior Publication Data

US 2017/0123762 A1 May 4, 2017

Related U.S. Application Data

(60) Provisional application No. 62/247,636, filed on Oct. 28, 2015.

(51) Int. Cl.
*G06F 9/44* (2018.01)
*G06F 8/34* (2018.01)
*G06F 8/30* (2018.01)
*G06F 8/33* (2018.01)

(52) U.S. Cl.
CPC .............. *G06F 8/34* (2013.01); *G06F 8/31* (2013.01); *G06F 8/33* (2013.01); *G05B 2219/23291* (2013.01)

(58) Field of Classification Search
CPC ....................................................... G06F 9/44

USPC .................................................. 717/106–109
See application file for complete search history.

(56) References Cited

U.S. PATENT DOCUMENTS

| 6,263,339 B1 | 7/2001 | Hirsch |
| 8,850,335 B2 | 9/2014 | Eldridge et al. |
| 8,972,947 B2 | 3/2015 | Orr et al. |
| 2002/0065848 A1* | 5/2002 | Walker ............... G06F 17/24 715/205 |

(Continued)

FOREIGN PATENT DOCUMENTS

WO WO 2013/192464 A 12/2013

OTHER PUBLICATIONS

PCT International Search Report and Written Opinion for PCT International Appln No. PCT/US2016/052958 dated Dec. 12, 2016. (11 Pages).

(Continued)

*Primary Examiner* — Jae U Jeon
(74) *Attorney, Agent, or Firm* — Womble Bond Dickinson (US) LLP

(57) ABSTRACT

In one embodiment, non-transitory computer-readable medium stores instructions for implementing a source code editor within an integrated development environment. The instructions to cause one or more processors to implement a method comprising receiving data at a source code editor, the data representing a data value to be used by source code displayed by the source code editor, inserting the data representing the data value into the source code, and displaying a graphical representation of the data value in the source code editor, the graphical representation displayed within a program code statement associated with the data value.

18 Claims, 13 Drawing Sheets

(56) References Cited

U.S. PATENT DOCUMENTS

| | | | |
|---|---|---|---|
| 2002/0104071 A1* | 8/2002 | Charisius | G06F 8/20 |
| | | | 717/109 |
| 2011/0283204 A1 | 11/2011 | Jacobs et al. | |
| 2012/0330638 A1* | 12/2012 | Pell | G06F 17/505 |
| | | | 703/21 |
| 2014/0115560 A1 | 4/2014 | Hutchinson | |
| 2014/0245256 A1 | 8/2014 | Petzoldt et al. | |
| 2016/0294813 A1* | 10/2016 | Zou | H04L 63/0815 |

OTHER PUBLICATIONS

PCT International Preliminary Report on Patentability for PCT/US2016/052958 dated May 11, 2018.

* cited by examiner

GRAPHICAL REPRESENTATION OF DATA IN A PROGRAM CODE EDITOR

CROSS REFERENCE TO RELATED APPLICATIONS

Applicant claims priority to provisional application Ser. No. 62/247,636 filed on Oct. 28, 2015, the entirety of which is incorporated herein by reference.

BACKGROUND OF THE DISCLOSURE

Many modern programming languages require advanced editing and compiling software in order to edit, debug and compile source code. In some development environments, a software developer generally engages in several manual steps before testing new code. For example, in a typical development lifecycle, source code must be separately edited, compiled, and executed before debugging can commence. To enhance the task of software development, developers can develop software applications using an integrated development environment (IDE). An IDE is a software application that usually includes an editor, a compiler and/or interpreter, build automation tools, and a debugger. Examples of IDEs include the Xcode® IDE from Apple Inc. of Cupertino, Calif. and the Visual Studio® IDE from Microsoft Corp. of Redmond, Wash. The editor of an IDE includes features that facilitate moving between files and accessing related reference materials (e.g., an application programming interface (API) definition). The editor of the IDE also includes features that facilitate viewing and editing text data (e.g., source code or XML) that, when executed displays graphical content (e.g., representations of programming components such as data models or graphical user interface (GUI) components).

Data in computer program code can be variable data or constant data (e.g., literal data). Variables in program code typically include references to memory or register addresses that store data that may be programmatically manipulated during execution of the program code. Literal data is represented as an explicit value that is literally represented within the computer program code. For simple values this literal data may be easily interpreted. However for values that represent complex data, literal values within the program code may not be easily interpreted.

SUMMARY OF THE DESCRIPTION

In one embodiment, non-transitory computer-readable medium stores instructions for graphically representing complex literal values inline within the source code editor of an Integrated Development Environment.

One embodiment provides for a method comprising receiving data at a source code editor, the data representing a data value to be used by source code displayed by the source code editor; inserting the data representing the data value into the source code; and displaying a graphical representation of the data value in the source code editor, the graphical representation displayed inline with and/or within a program code statement associated with the data value.

One embodiment provides for a system comprising one or more processors and a computer readable medium comprising instruction which, when executed by the one or more processors, cause the one or more processors to perform various operations. In one embodiment the operations include to execute a source code editor, the source code editor to display a source code listing of program code; receive data at the source code editor, the data representing a data value to be used by the program code; insert the data representing the data value into the source code; and display a graphical representation of the data value in the source code editor. The graphical representation can be displayed within a program code statement associated with the data value.

One embodiment provides for a non-transitory computer-readable medium with instructions stored therein, the instructions, when executed by a processor, cause the processor to perform operations, the operations comprising receiving data at a source code editor, the data representing a data value to be used by source code displayed by the source code editor; encoding an a representation of the data received at the source code editor into an encoded representation of the data; inserting the encoded representation of the data value into the source code; and displaying a graphical representation of the data value in the source code editor in place of the encoded representation, where the graphical representation is displayed within a program code statement associated with the data value.

The above summary does not include an exhaustive list of all aspects of the present invention and other features will be apparent from the accompanying drawings and from the detailed description. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Figure 1:
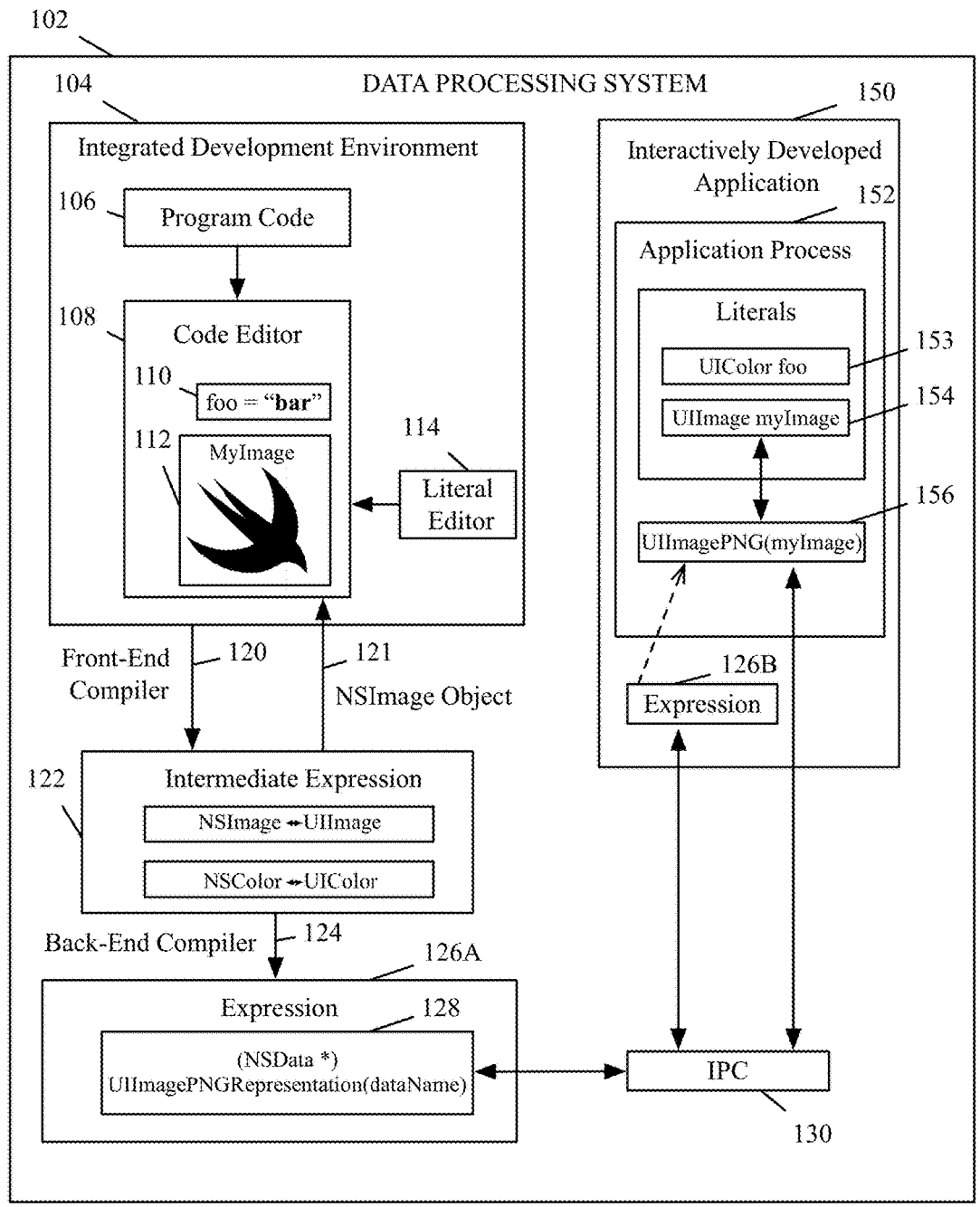
FIG. 1 is a block diagram of a data processing system and integrated development environment, according to an embodiment.

The present application describes various embodiments regarding presentation of data values in graphical user interfaces of software development tools such as integrated development environments (IDE's). Embodiments of the IDE as described herein provide for an interactive development environment in which each statement of program code is interactively evaluated and displayed as the program code is entered into the editor of the IDE. The interactive environment enables experimentation with algorithms and system APIs as in a standard development environment while providing the benefit of automatic evaluation of expressions with automatic display of the results. To enhance the interactive development process, literal data values can be represented inline within the source code of the program when displayed within the source code editor when working with program instructions that make use of complex types of data, such as graphical images, files, web pages, application documents, videos, and so on. The literal data values can be displayed as graphical representations of the literal data values within a line of program code that makes use of the literal data value.

Definitions and representations for this complex data can be inserted into existing IDE's as constant or 'literal' data. While the data is represented inline within the source code, the data may represent data that may not be easily and/or quickly interpreted. The graphical display of literal data can enable a developer to easily view and manipulate the values of literal data during the development process and the results of the manipulation can be displayed inline within the editor of the IDE. The literal data that represents complex data types such as color data, audio data, video data, or data files including image or text data graphically in an editor of an IDE. In one embodiment the literal data can also represent multimedia data such as video, and/or audio data and can also be represented graphically in the editor of the IDE. In one embodiment a developer can define a custom data type and a custom handler for the custom data type can be used to graphically display representations of literal data of the custom data type. Representing the data graphically enables a developer to interactively manipulate the data using user interface tools. The graphical representation may be copied and pasted in the editor in a similar manner as text, and can be manipulated via the user interface of the editor of the IDE. While the data is represented graphically to the developer, the data can be encoded into a text value that can be parsed by a compiler into executable instructions.

Exemplary source code is illustrated and described that is consistent with program code instructions in the Swift programming language. However, embodiments are not limited to the use of the Swift programming language. The concepts described herein may also be applied to source code editors and integrated development environments having support for languages such as C, Objective C, C++, Java, and/or any other programming language.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

The illustrations of graphical user interface images in the figures described below include material protected by copyrights. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2015.

Inline Graphical Representation of Data in an Integrated Development Environment FIG. 1 is a block diagram of a data processing system 102 and integrated development environment 104, according to an embodiment. The data processing system 102 can be a desktop or mobile computing or data processing system executing an operating system such as the Mac OS X® operating system from Apple Inc. of Cupertino, Calif. The data processing system 102 may also be a different type of computing system that executes a different operating system. The integrated development environment 104 can be, for example, the Xcode® Integrated Development Environment (IDE), which provides features that software developers can use to create, execute, and debug computer program code. In one or more embodiments, the IDE 104 executes as an application process on the data processing system 102 in conjunction with an interactively developed application 150. The interactively developed application 150 can execute as an application process 152 in a different memory address space than the application process of the IDE, although in some implementations the application process 152 of the interactively developed application 150 and the application process of the IDE 104 can be combined in a single process in the same memory address space.

The IDE 104 presents a user interface including a code editor 108 on a display of the data processing system 102. The code editor 108 can display a listing of program code 106, such as the source code of the interactively developed application 150. In one embodiment the source code can be program code instructions in the Swift programming language. However, embodiments are not limited to the use of the Swift programming language, as in one embodiment the source code may also be coded in a language such as C, Objective C, C++, Java, and/or other programming languages. The IDE 104 provides control over the execution of the interactively developed application 150. In one embodiment the IDE 104 can dynamically compile and execute additional program code instructions as the instructions are entered into the code editor 108, enabling the interactively developed application 150 to be coded, executed, debugged, and re-coded in an interactive manner.

In one embodiment the code editor 108 can display the program code 106 inline with variable or literal data that makes up the application process 152 of the interactively developed application. For example, color data can be represented by a literal value 110 named "color" that has a numerical value associated with the color "red." Instead of, for example, a Red/Green/Blue/Alpha tuple associated with red (e.g., {1, 0, 0, 1}), the program code assignment of the numerical value associated with the color red can be displayed as color="red." In addition to or as an alternative to using a text encoding to represent the color red, a chromatic indicator of the color red (represented as bold text) may be graphically displayed. Alternatively, a red color swatch may be displayed, or any other graphical indication can be provided to convey the color data associated with the underlying numerical value to be assigned to "color.

Likewise, an image may be represented by a literal value 112 that represents image data, such as a reference to an image data file. In addition or as an alternative to displaying the literal reference to the image data, a graphical representation of the image may be shown inline with the program code within a program code statement associated with the image data. The graphical representation of literal value 110 and literal value 112 can be copied and pasted in the editor in a similar manner as text. Additionally, the graphical representation of the literal values can be manipulated using tools provided by the IDE 104.

In one embodiment a literal editor 114 is provided that enables the insertion or modification of the literal data. For example, the graphical representation of the literal data may be interacted with (e.g., clicked, touched, etc.) to access the literal editor 114 and the literal editor 114 can enable the selection of a different image or file or enable graphical editing of the literal data. For example, a interacting with a graphical representation of literal color data may access a literal editor 114 in the form of a color selector, which enables the graphics selection or manipulation of color data. The selection or manipulation of the color data may then be reflected in the graphical display of the inline literal data. In one embodiment, in response to the selection or manipulation of the color data, the IDE 104 can automatically compile the program code 106 and execute the resulting instructions via the application process 152 of the interactively developed application 150.

In one embodiment, graphical representations inserted into or manipulated in the code editor 108 of the IDE 104 are represented in the underlying program code as an encoded value that may be parsed and processed by a compiler. The specific encoding of the graphical representation can depend on the capabilities of the compiler or the functionality provided by the language in which the program code is written. For example, the graphical data may be represented as text based on an American Standard Code for Information Interchange (ASCII) or Unicode encoding format, or any encoding format that is consistent with a programming language and associated compilation system supported by or accessible to the IDE 104.

The graphical data can be encoded into a representation suitable for processing by a front-end compiler 120 of the IDE 104. The front-end compiler 120 may be a portion of a compilation system integrated within the IDE 104 or compilation system stored on the data processing system 102 and made accessible to the IDE 104. In one embodiment the IDE 104 uses a compilation system based on the LLVM compiler infrastructure, although other compilation systems may be used. The front-end compiler 120 analyzes the program code to build an internal representation of the program. For example, the front-end compiler 120 can compile the encoded representation of the graphical data into an intermediate expression 122.

If needed, the intermediate expression 122 can be used to translate the data object represented by the encoded representation into an expression that is executable by the application process 152. Based on the intended target of the interactively developed application 150, the data may undergo a data type translation. For example, the IDE 104 may execute on a data processing system 102 having operating system support for image data in the NSImage data type, while the application process 152 may be developed for a target system having operating system support for image data in the UIImage data type. Additionally, the IDE 104 may use the NSColor data type while the application process 152 may expect color data in the form of the UIColor data type. The specific data types are listed as examples and any data type that may be graphically represented in the code editor 108 of the IDE 104 may be translated or interpreted during compilation into the appropriate data type for use by the application process 152.

In one embodiment a back-end compiler 124 can further compile the intermediate expression 122 of the graphically displayed data into an expression 126A usable by compiled and executable instructions of the application process 152. For example, a literal value 112 associated with image data can be further processed into an expression 126A containing a data representation 128 specific to the underlying image data (e.g., (NSData*) UIImagePNGRepresentation(dataName) for data in the Portable Network Graphics (PNG) format). The expression 126A may be transmitted via a form of inter-process communication (IPC) (e.g., IPC 130) into the interactively developed application 150 as an expression 126B for use in the insertion or modification of data used by the executable instructions of the application process 152. For example, the expression 126B may indicate to insert the data 156 associated with the UIImagePNG(myImage) representation as an image literal 154 (UIImage myImage) to be used by the application process 152. The expression 126B may also cause the interactively developed application 150 to set or modify the value of a color literal 153 (UIColor color) used by the application process 152.

The specific data types shown in FIG. 1 and described above used for exemplary and not limiting purposes, as the system, processes, and associated logic described herein can generally be used for any literal data type supported by the IDE 104 and underlying programming language associated with the program code 106. Additionally, at least some of the techniques may also apply to variable data types having values derived from a literal data type having a graphical representation displayed in the code editor 108 of the IDE 104.

Insertion and Use of Graphically Displayed Literal Data

Figure 2:
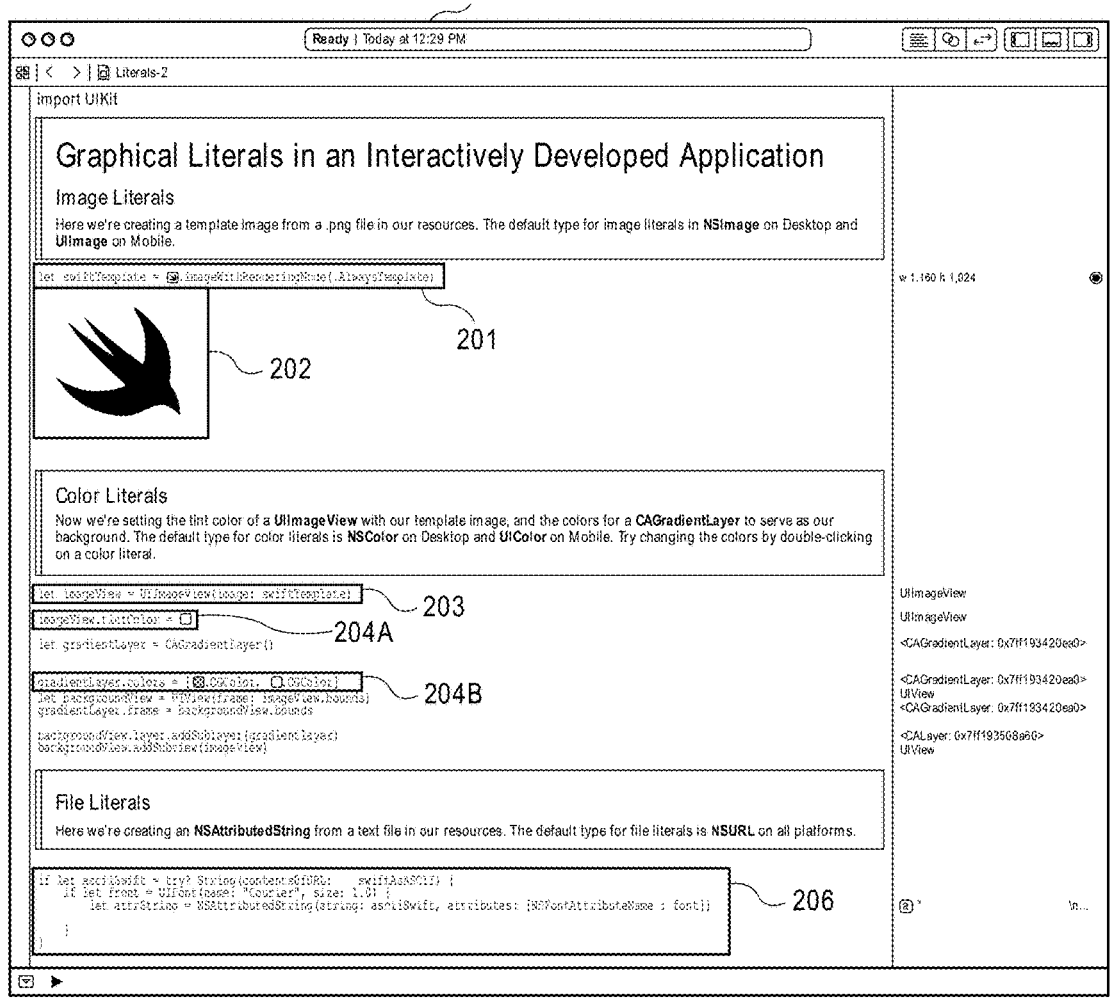
FIG. 2 is an illustration of exemplary types of graphical literals for use in an interactively developed application.

FIG. 2 is an illustration of exemplary types of graphical literals for use in an interactively developed application. As illustrated, graphically displayed literal values can be included within and manipulated by program code statements within a code editor 108. Multiple program code statements are illustrated, including program code statements that manipulate an image literal (e.g., program statement 201), a color literal (e.g., program statement 204A-B), and a file literal (e.g., program statement 206). In one embodiment, a result 202 of a program statement 201 that includes a graphically displayed literal can be displayed in association with the program statement 201 that generated the result. Additionally, literals defined using graphically displayed literals may be used as parameters to other program code, as in program code statement 203. Specific examples of the creation and manipulation of graphically displayed literals are shown in FIGS. 3-5 below.

Figure 3A:
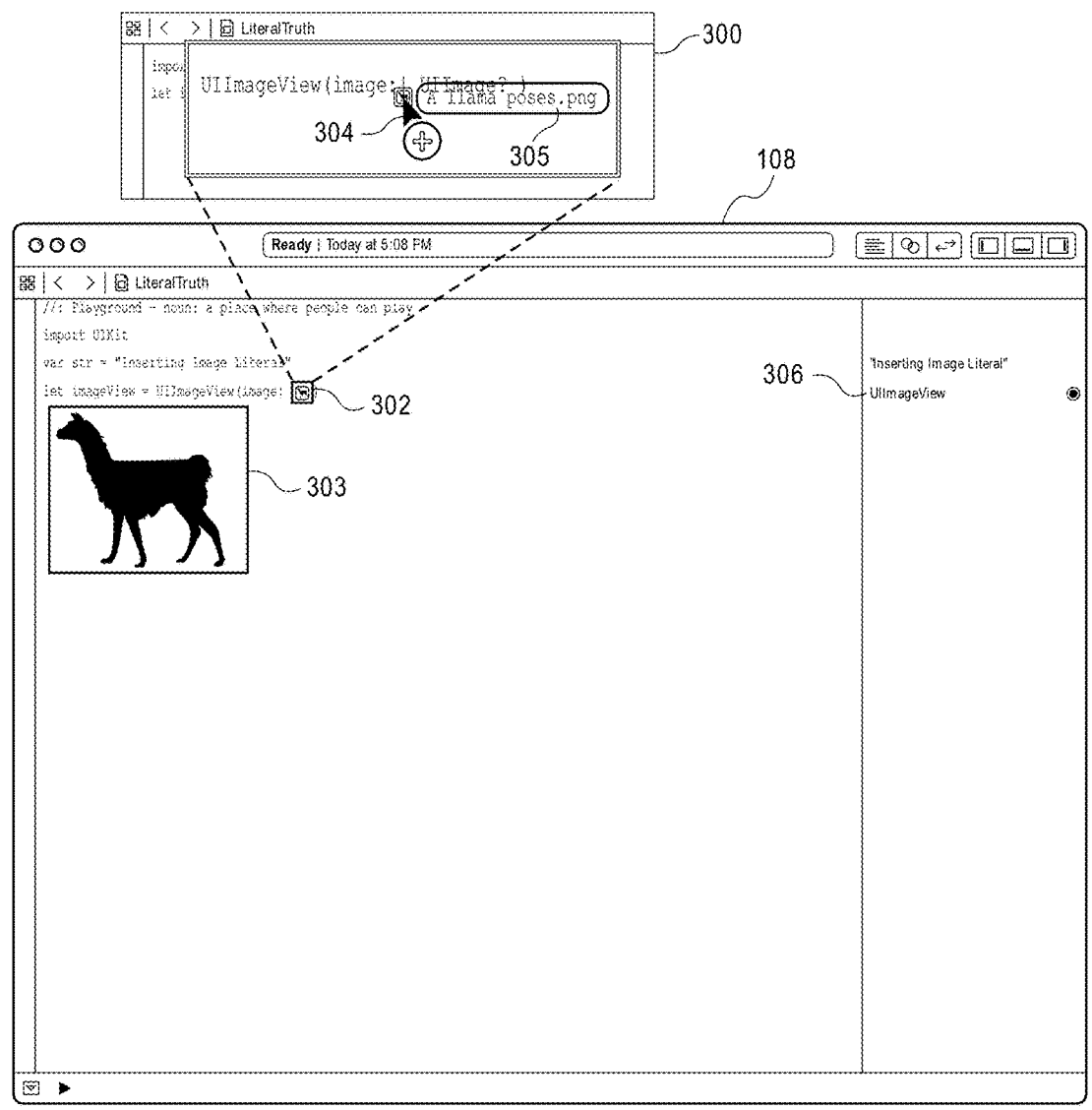
FIGS. 3A-3C illustrate the insertion and manipulation of a graphically displayed image literal into a code editor, according to one embodiment.
Figure 3B:
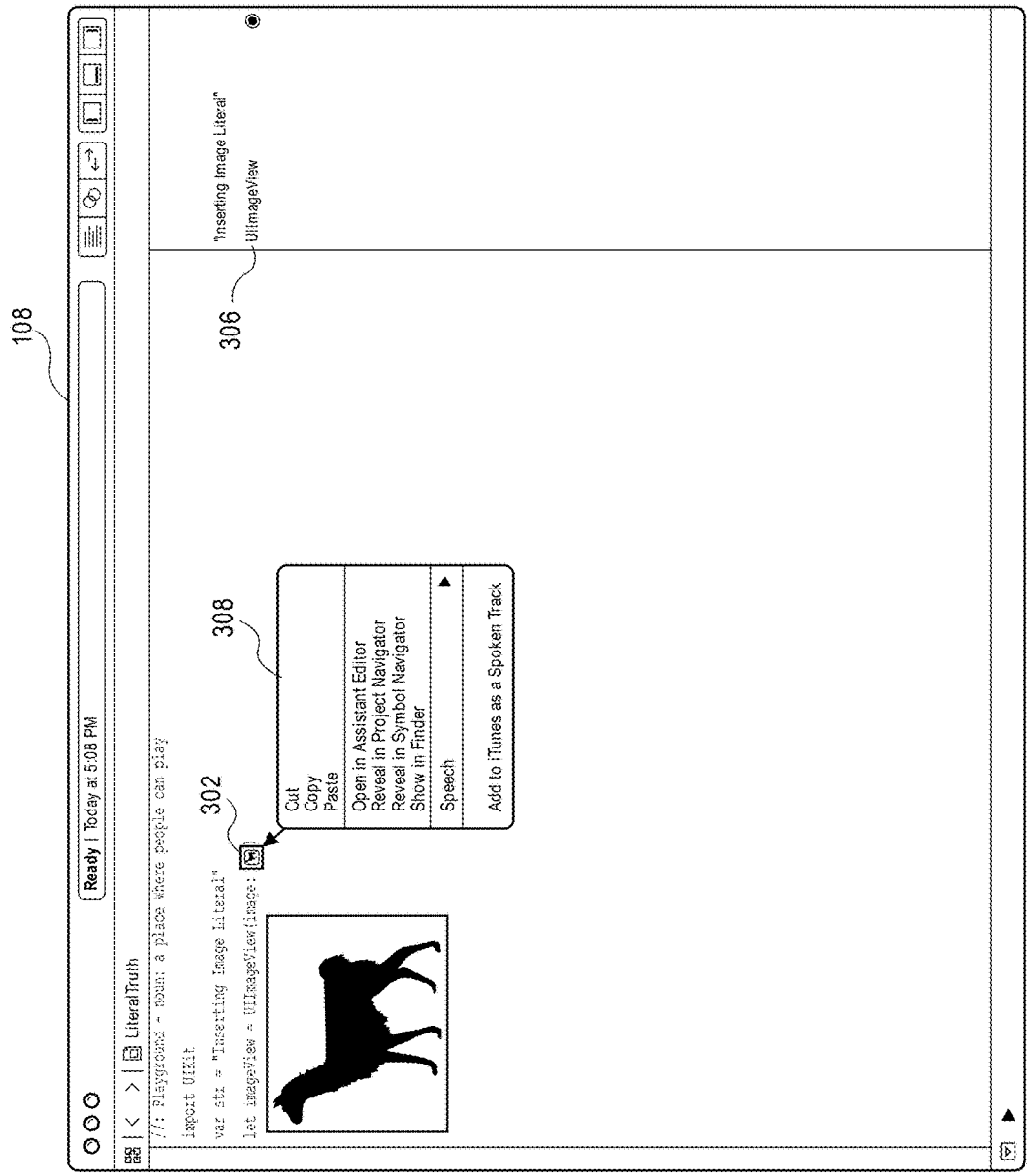
Figure 3C:
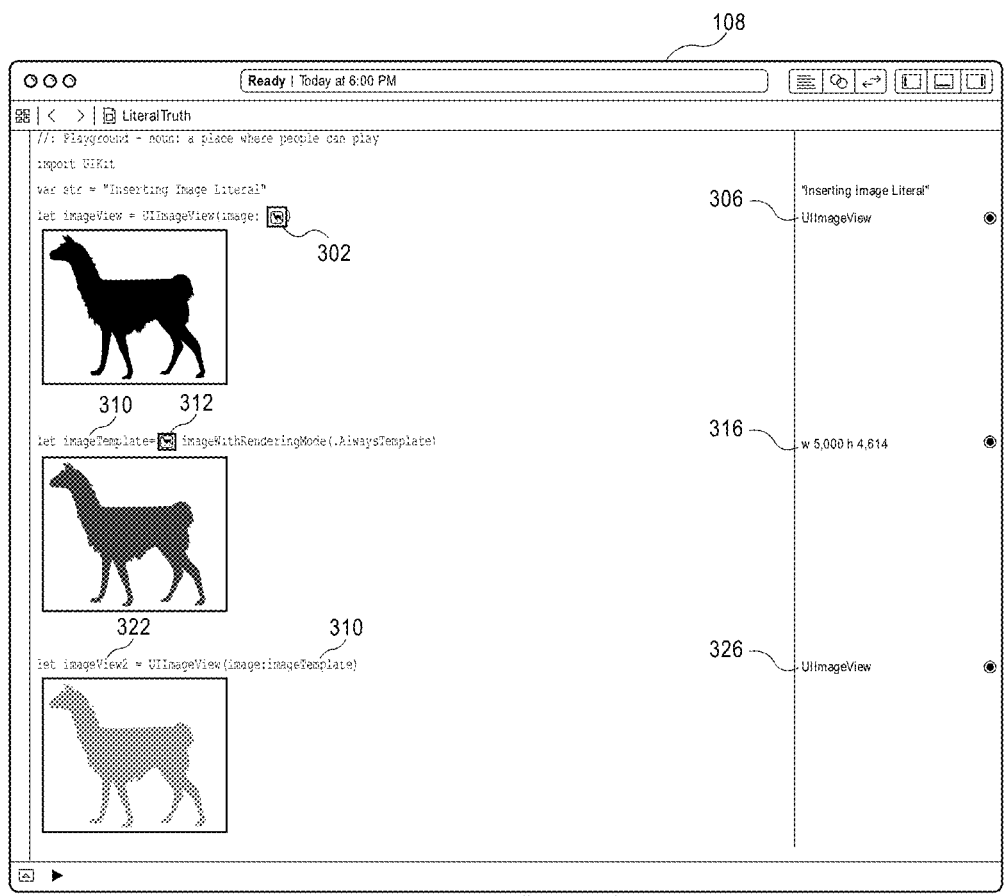

FIGS. 3A-3C illustrate the insertion and manipulation of a graphically displayed image literal into a code editor 108, according to one embodiment. FIG. 3A illustrates a drag-and-drop process for initializing an image argument of the UIImageView class using an image literal referencing a file. FIG. 3B illustrates a process for graphically manipulating the image literal using user interface tools. FIG. 3C illustrates how the graphically displayed image literal can be manipulated using interface tools and program code. While FIGS. 3A-3C illustrate and describe graphically displayed image literals, the processes illustrated, in some instances, can also apply to all other forms of graphically displayed literals, such as color literals and file literals.

As shown in FIG. 3A, an image file to be used as an image literal can be inserted into the code editor 108 using a drag-and-drop process. To insert an image literal 302 into the source editor, an image file to be used as an image literal 302 can be located within a file system viewer or via file manager of the operating system on the data processing system that is executing the IDE and, using the GUI, the file can be dragged into the code editor 108. As shown in view 300, a developer via the GUI can click or touch a representation of the file to insert, the representation can be dragged into the code editor 108 and deposited at a position of the code editor 108 corresponding to a program code statement that accepts the literal image (e.g., UIImageView(image: UIImage?). The code editor 108 can display an indication 305 of the file to be inserted (e.g., "A llama poses.png"). In one embodiment an insertion point 304 tracks a user interface pointer during the drag-and-drop process to indicate a location within the code where the image literal can be placed.

As an alternative to the drag-and-drop process, a developer can use an operations menu (not shown) and select a command to insert the image literal at a desired insertion point within the program code using a file selection window provided by IDE. The file selection process is illustrated with respect to a file literal in FIG. 5 below.

In one implementation, once the literal is added to the code, the image literal 302 is indicated as a rounded rectangle enclosing a scaled version of the image represented by the literal. Additionally, the code editor 108 can indicate the data type 306 of the literal within a sidebar region of the code editor 108. In one embodiment, an additional graphical representation 303 is shown within the code editor 108 that illustrates the outcome of the program statement including the image literal 302.

As shown in FIG. 3B, the image literal 302 can be manipulated using user interface tools in a manner similar to program code. For example, a developer can select the image literal 302 and using a standard user interface operation window 308 can cut or copy the image literal 302, or a reference thereto, to the system clipboard stored in memory of the data processing system. Additionally, other operations that may be supported by the operating system for program code may also be performed. In one embodiment when the image literal 302 cut, copied, or otherwise manipulated or operated upon, the underlying text encoding of the image literal 302 is copied into memory. In such embodiment when the clipboard version of the image literal is pasted into a standard text editor or into a code editor without support for the image literal 302, the text encoding of the image literal is inserted and displayed. An exemplary encoding of the program code statement of FIG. 3B containing the image literal 302 is shown in code statement 1 below.

Code Statement 1—Program Code Statement Including Encoded Image Literal let imageView=UIImageView(image:[#Image(imageLiteral: "a llama poses.png")#])

As shown in code statement 1, the image literal 302 can be encoded using a "[#]" statement that specifies an image based on an imageLiteral and lists the file name containing the data from which the image literal is derived (e.g., [#Image(imageLiteral: "someImage.png")#]). The code editor 108 can recognize the file name in the encoded statement and display the image data contained in the file in place of the encoded statement. It will be understood, however, that embodiments may vary with respect to specific implementation details, and other encoding methods may be used beyond what is shown in code statement 1. In one embodiment, files used for certain types of literals, including but not limited to image literal and file literals, are automatically copied to a specific and/or predetermined location, which may be a location in or folder within an application bundle containing code and resources for the interactively developed application into which the graphically displayed literal is inserted. Storing the file in a predetermined location allows the encoding to reference a file name without requiring a full path description to the file. However, an embodiment may also allow the referencing of a file that is outside of the predetermined location used for application resources. In such embodiment, a more complete description of the location of the file can be used.

As shown in FIG. 3C, an inserted image literal 302 can be copied and pasted for use with additional program statements. Additionally, text literals defined using graphically displayed literals can be used to define other literals. For example, the graphically display image literal 302 can be copied using the interface tools illustrated in FIG. 3B and the copied image literal 312 can be used in additional program statements, such as the illustrated program statement defining the value imageTemplate 310. The definition for imageTemplate 310 is shown using a program statement that defines additional data for imageTemplate 310 literal (e.g., imageWithRenderinMode (.AlwaysTemplate). In general, any programmatic functionality that would be available in a fully text based code statement can be used when using a graphically displayed literal. The side bar region of the code editor 108 can display additional content regarding the operation of the program statement to define the imageTemplate 310 value. For example, a size 316 for image data used for the template can be shown when the program statement is executed.

Using the defined imageTemplate 310, further literal values can be defined. For example, an additional program statements can define an additional literal (e.g., imageView2 322) based on the previously defined imageTemplate 310. A data type 326 associated with the assignment can also be shown in the sidebar of the code editor 108.

Figure 4A:
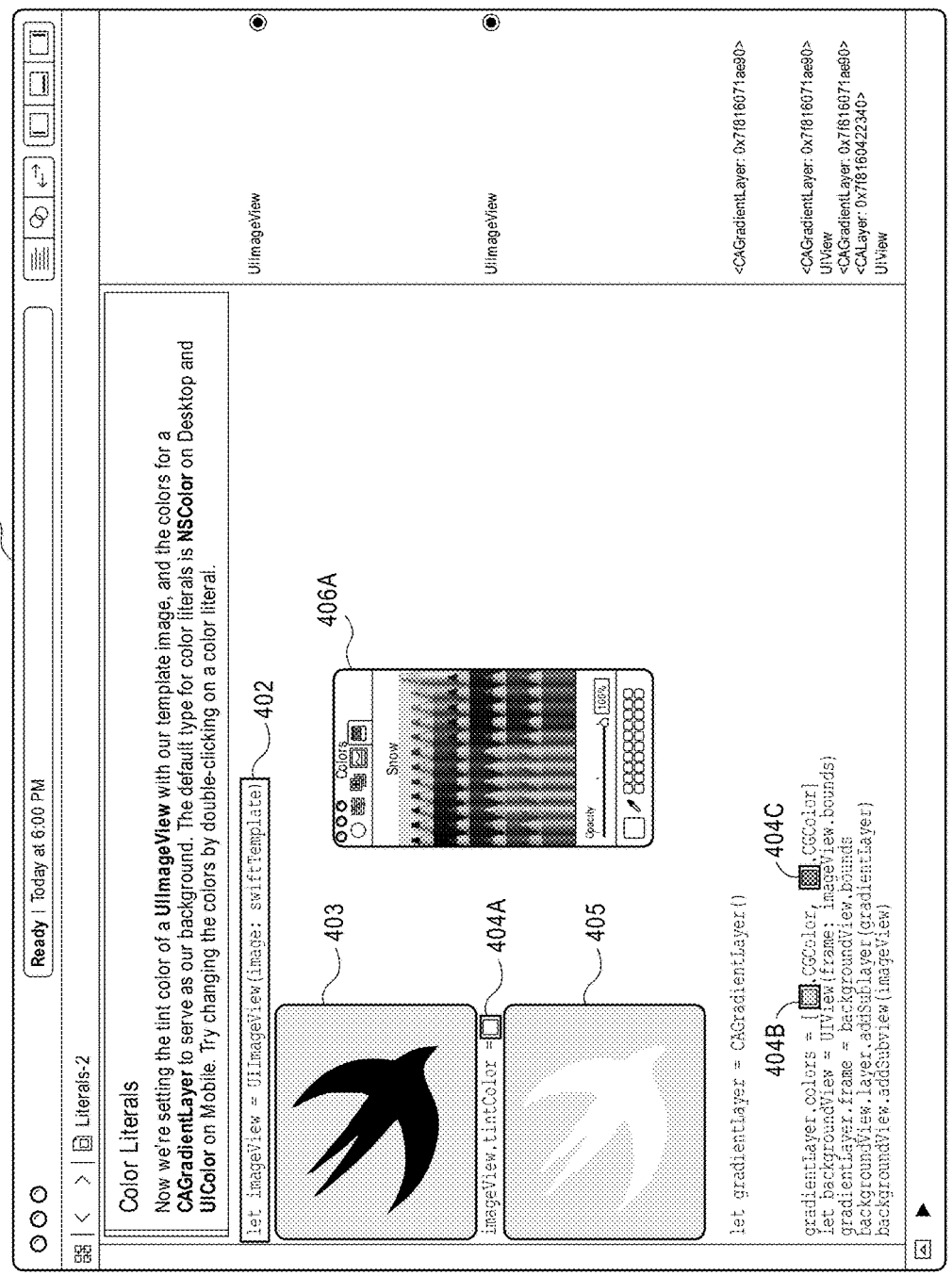
FIGS. 4A-4B illustrate the insertion and manipulation of a graphically displayed color literal into a code editor, according to one embodiment.
Figure 4B:
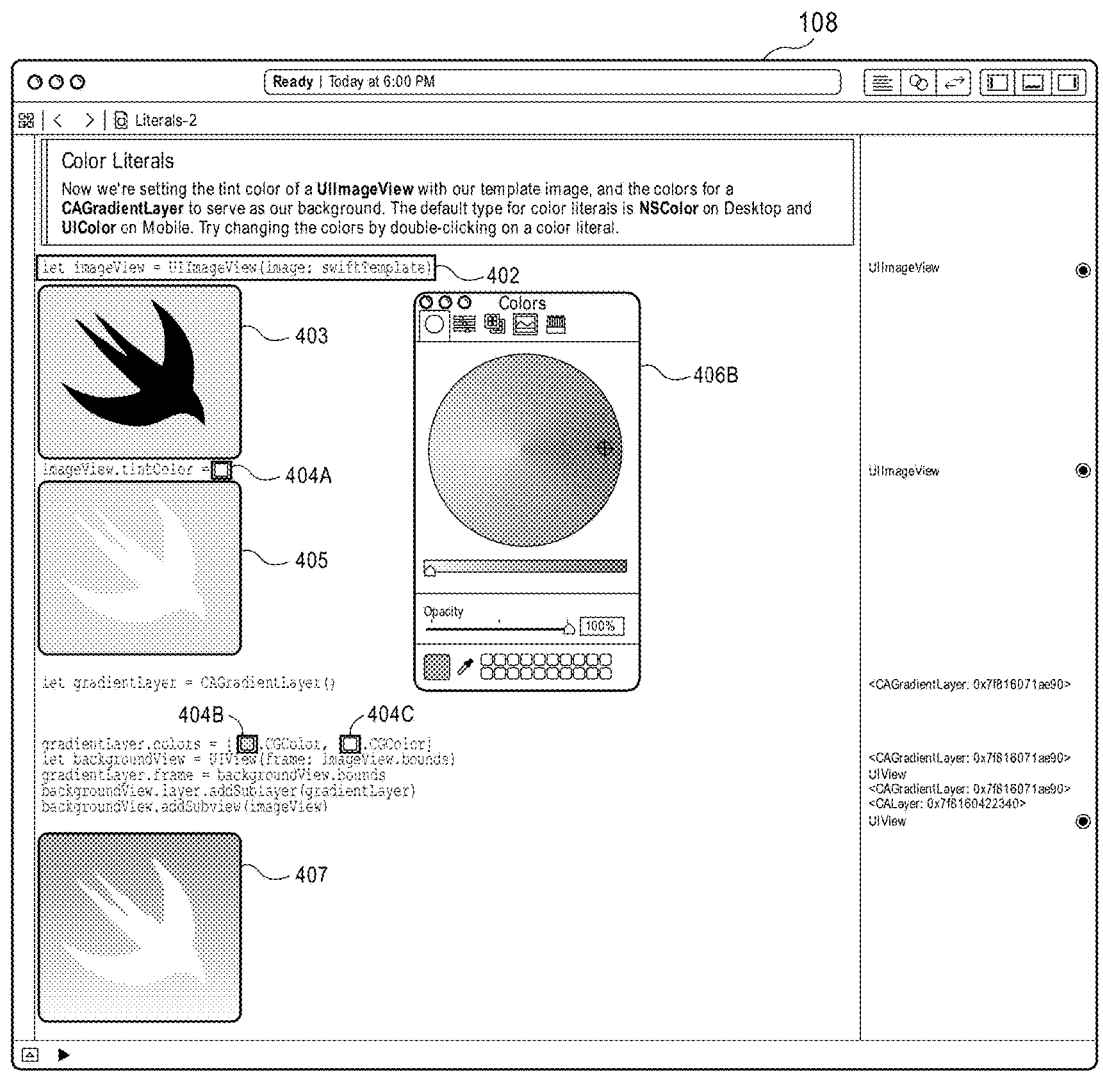
Figure 5:
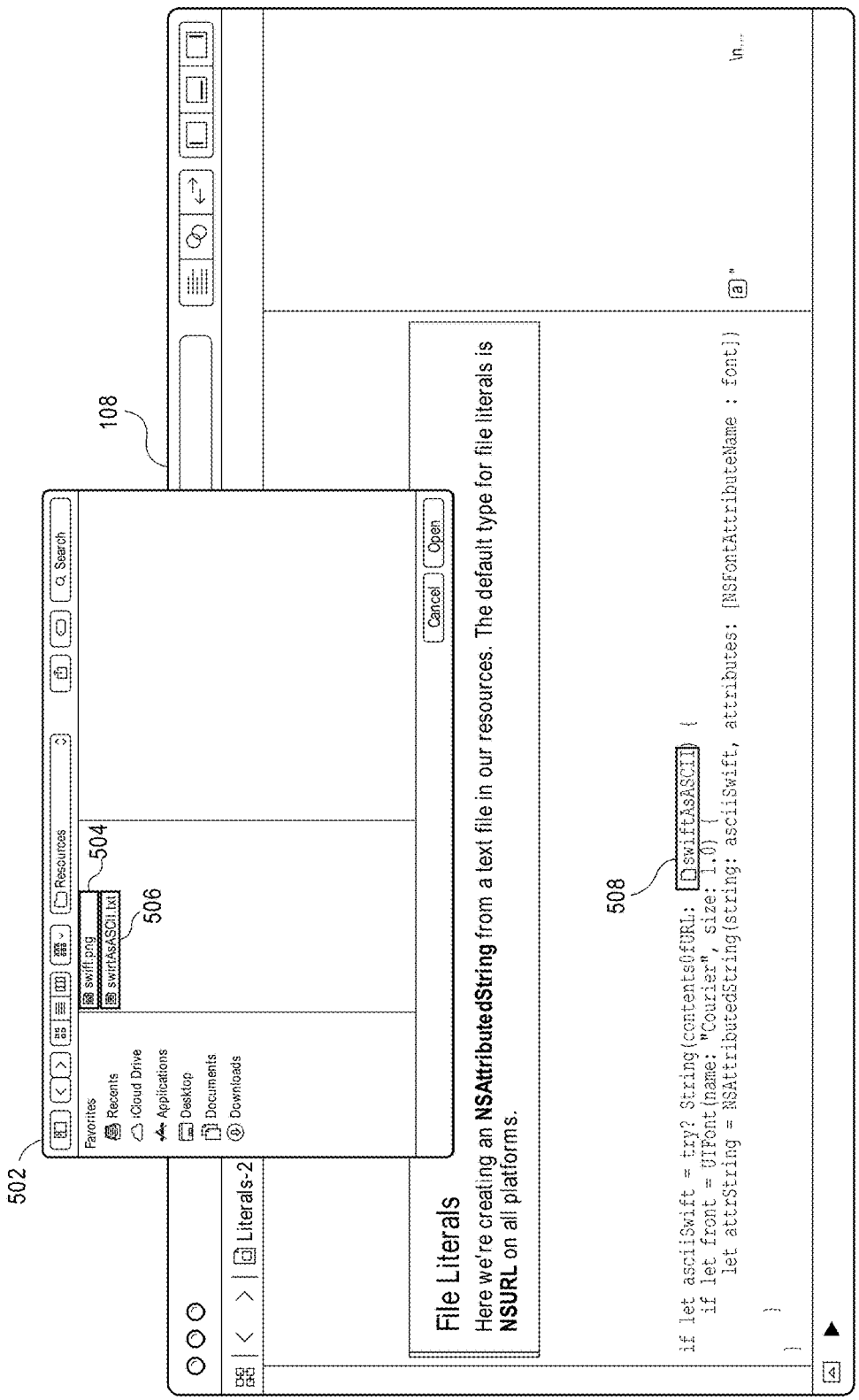
FIG. 5 illustrates the insertion of a graphically displayed file literal into a code editor, according to one embodiment.

FIGS. 4A-4B illustrate the insertion and manipulation of a graphically displayed color literal into a code editor 108, according to one embodiment. FIG. 4A illustrates the insertion of a color literal into the code editor 108. FIG. 4B illustrates editing the color literal after insertion into the code editor 108.

As shown in FIG. 4A, in one embodiment the code editor 108 can display color literal data graphically inline with and within program code statements. A program code statement 402 can be used to define an image data type (e.g., UIImageView) and a developer can edit attributes of the image data type using graphically displayed color literal data. For example, in response to the completion of the program code statement 402 to define the imageView value of FIG. 4A, the code editor 108 can determine the validity of the program statement. If the program code statement 402 is valid a compiler associated with the IDE containing the code editor 108 can compile the program statement into an executable expression. In one embodiment the result 403 of the execution of the expression can be shown, although the display of inline results can be enabled, disabled, and configured independently of the inline graphical display of image literal data.

In one embodiment an attribute of the defined image can be adjusted by assigning a first color literal 404A. The first color literal 404A can be inserted using an editor option of the code editor 108. In response to selection of the editor option to insert a color literal, a color picker 406A can be displayed to select a value for the first color literal 404A. Any value selected can be graphically displayed in the code editor 108 inline with the program code, such that the program code statement displays a value assignment to a graphical representation of the assigned color. The result 405 of the program statement assignment using the color literal value can also be displayed in the code editor 108.

A second color literal 404B and third color literal 404C can also be inserted into the code editor 108 in a manner similar to the insertion of the first color literal 404A. As in the case of the graphically displayed image literals described in FIGS. 3A-3C, each color literal 404A-C can have an underlying text based encoding of the graphically displayed literal value. The underlying text based encoding can be inserted into the program code of the application and the code editor 108 can automatically interpret a text encoding of the color literal to display the color values that the underlying text represents. A code statement showing an exemplary text encoding of a color literal is shown in code statement 2.

Code Statement 2—Program Code Statement Including Encoded Color Literal imageView.tintColor=[#Color(colorLiteralRed: 1, green: 1, blue: 1, alpha: 1)#]

As shown in FIG. 4B, once a color literal is inserted into the code editor 108, the value of the color literal can be edited using graphical interface tools. A developer can tap, click, or otherwise interact with the displayed color literals (e.g., first color literal 404A or second color literal 404B) to re-enable the color picker 406B. In addition to color pickers 406A-B, several other forms of color pickers and editors may be provided that enable the selection of a range of colors available on the data processing system. Enabling developers to graphically select color literal values for program code using the color literal tools 406A-B illustrated enables a more accurate and efficient selection of colors for use in a program relative to the use of the underlying color data that is represented in the encoded color values of code statement 2. In one embodiment, in response to any change in the color literal data, the result 407 of the program statements that make use of the color literal data can be displayed in the code editor 108.

FIG. 5 illustrates the insertion of a graphically displayed file literal 508 into a code editor 108, according to one embodiment. In one embodiment the insertion of the file literal 508 can be performed using the drag-and-drop process of FIG. 3A or via a menu option of the code editor 108. Selecting the menu option of the code editor can cause a user interface window 502 to appear, through which a developer can select a file 506 to insert as a file literal. Once a file is selected, an encoding for the graphically displayed file literal can be inserted into the underlying source code, which is then displayed via the source editor 108 as a graphical literal value. The graphical display of the file literal 508 can be manipulated in a manner similar to the image and color literals. The graphically displayed file literal 508 can be copied and pasted in a manner similar to text based program code. A code statement showing an exemplary text encoding of a color literal is shown in code statement 3.

Code Statement 3—Program Code Statement Including Encoded File Literal let asciiSwift=try? String(contentsOfURL: [#FileReference (fileReferenceLiteral: "swiftAsASCII.txt")#])

In one embodiment the file literal 508 is interpreted as resource locator data type (e.g., NSURL) that references the inserted file literal. However, the data type of the file literal can vary according to embodiments, and based on the underlying programming languages and compiler types supported in such embodiment. In some embodiments the data type of the file literal can vary based on the type of file inserted (e.g., image, audio, video, etc.). For example and in one embodiment, an image file 504 (e.g., swift.png) can also be selected for insertion as a file literal and the code editor 108 can interpret the inserted image file literal as an image literal.

Figure 6:
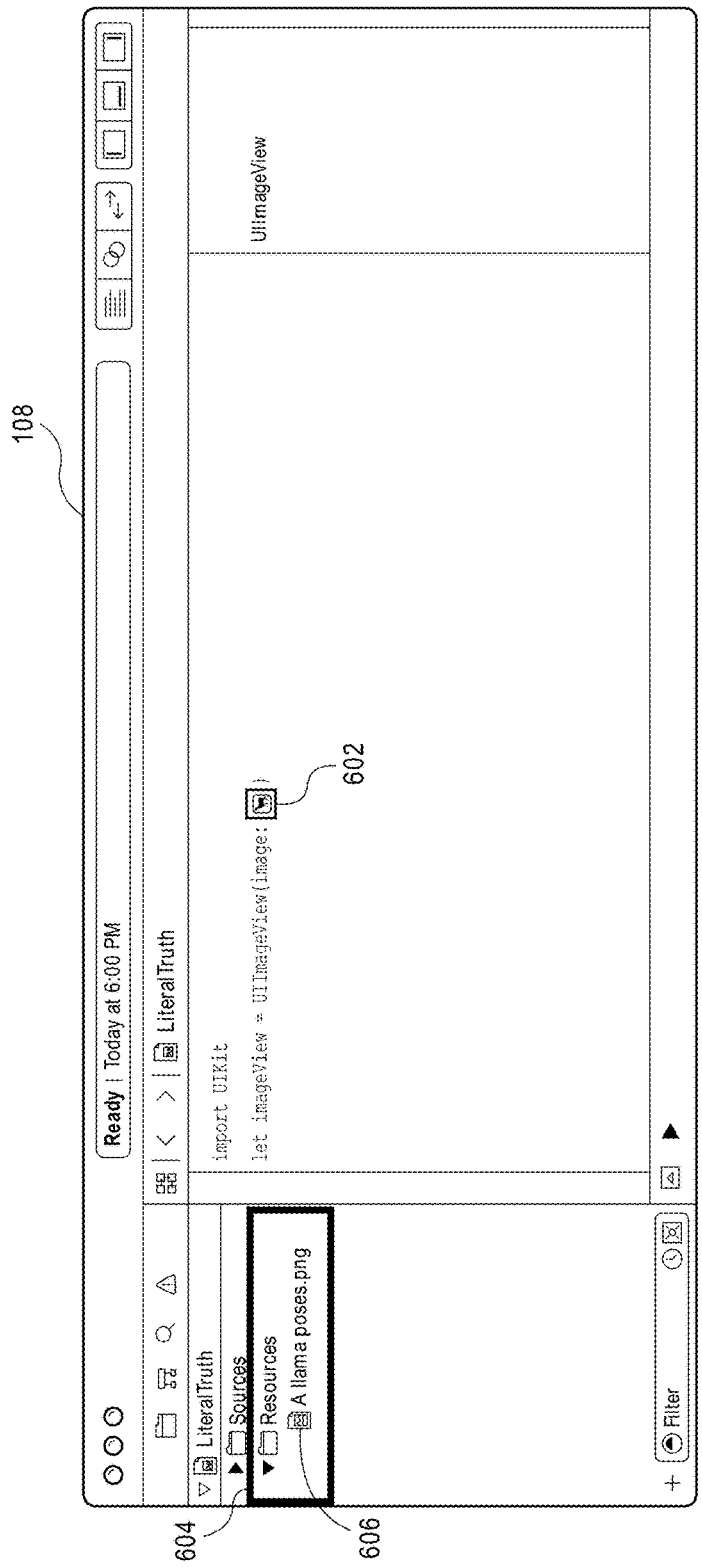
FIG. 6 is an illustration showing the storage of a data file resource, according to an embodiment.

FIG. 6 is an illustration showing the storage of a data file resource, according to an embodiment. In one embodiment, data files containing data for use as literal data is automatically copied to a specific and/or predetermined location, which may be a location in or folder within an application bundle containing code and resources for an interactively developed application into which the graphically displayed literal is inserted. For example, a data file 606 containing data for the illustrated image literal 602 can be stored in a resource folder 604 associated with the interactively developed application. The data file 606 can be inserted into the resources folder 604 before the image literal 602 is inserted into the code editor 108, as shown in FIG. 3A. Alternatively, by dragging-and-dropping the data file 606 into the code editor 108, the data file 606 can be automatically copied to the resources folder 604.

Figure 7:
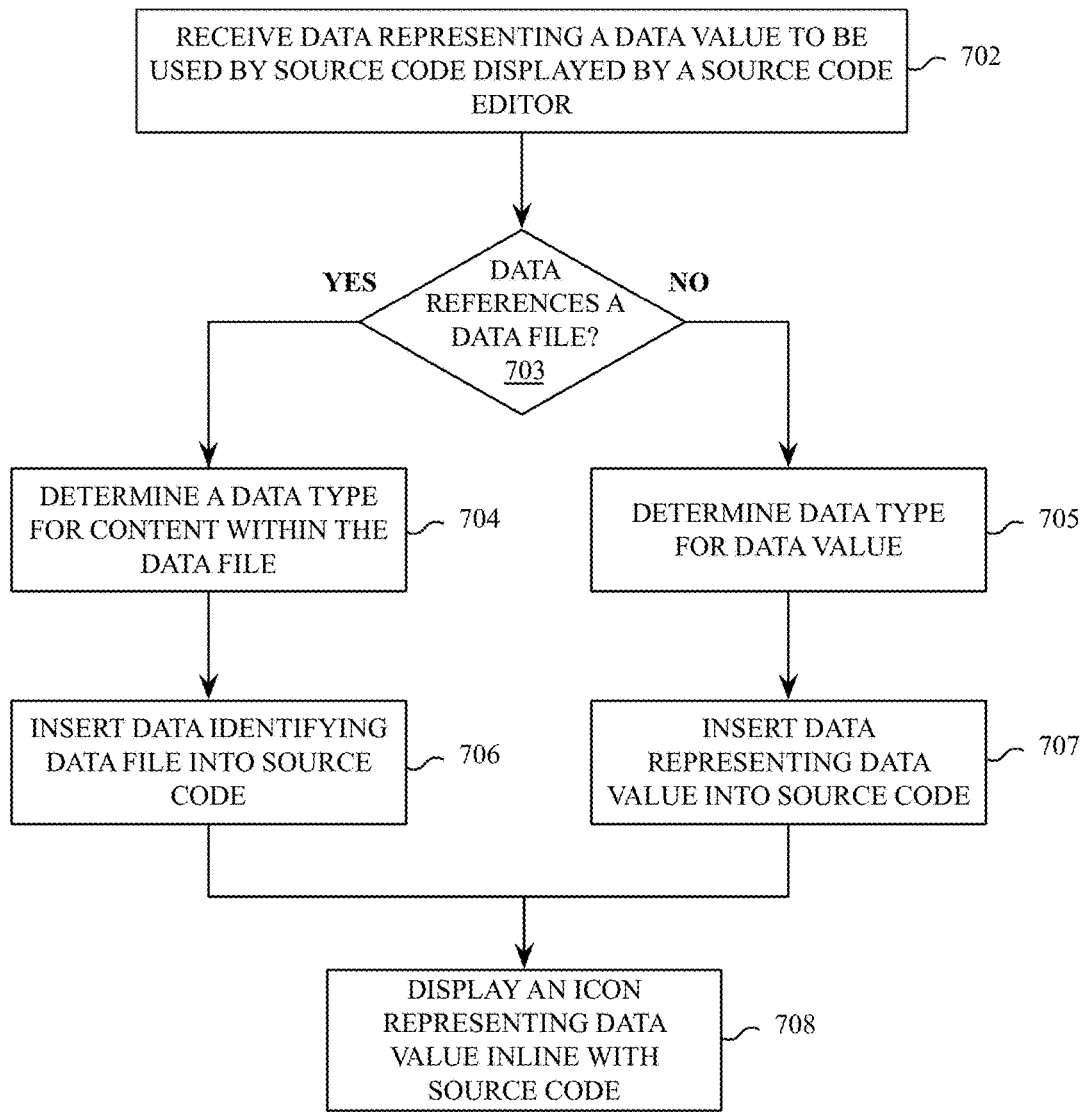
FIG. 7 is a flow diagram illustrating graphical data value representation logic, according to an embodiment.

FIG. 7 is a flow diagram illustrating graphical data value representation logic 700, according to an embodiment. In one embodiment the graphical data value representation logic 700 can be performed by source code editor logic or by other logic components of an IDE containing the source code editor. The graphical data value representation logic 700 can configure a data processing system to receive data representing a data value to be used by source code displayed by a source code editor, as shown at block 702.

At block 703, the graphical data value representation logic 700 can determined if the received data references a data file containing data to be used by source code (e.g., as a literal value) or if the received data itself represents the data value to be used by the source code. If at block 703 the graphical data value representation logic 700 determines that the data references a data file, the logic can determine a data type for content within the data file at block 704. In various embodiments, the content can include text data, image data, multimedia data such as audio and/or video data, or other kinds of data, such as data of a custom data type. Additionally, in one embodiment the data file referenced by the received data can be automatically copied to a predetermined location designated to store resources used by the source code.

If at block 703 the graphical data value representation logic 700 determines that the received data is itself a literal data value and does not reference a data file the logic can determine a data type for the received data at block 705. In one embodiment, color literal data can be inserted into the source code. Additionally, a developer can define custom data types. If a custom data type has been defined, the graphical data value representation logic 700 can determine if the received data matches the custom data type at block 705.

After determining the data type of content within the data file at block 704, the graphical data value representation logic 700 can insert data identifying the data file into source code at block 705. In one embodiment the data identifying the data file can be encoded to represent the type of data referenced in the data file, for example, as in code statement 1 and code statement 3 above. After determining the data type for the received data at block 705, the graphical data value representation logic 700 can insert data representing the data value into the source code at block 707. For example, for data representing a color literal data value, an encoded representation such as in code statement 2 can be inserted into the source code.

At block 708, the graphical data value representation logic 700 can display an icon representing the data value inline with the source code. The icon representing the data value can be used within program code statements that make use of the data value. The icon representing the data value, in one embodiment, can be displayed in place of the data identifying a data file containing the data value that is inserted at block 706, or the data representing the data value that is inserted at block 707. The icon representing the data value can be displayed inline with or within the program statement associated with the data value.

Figure 8:
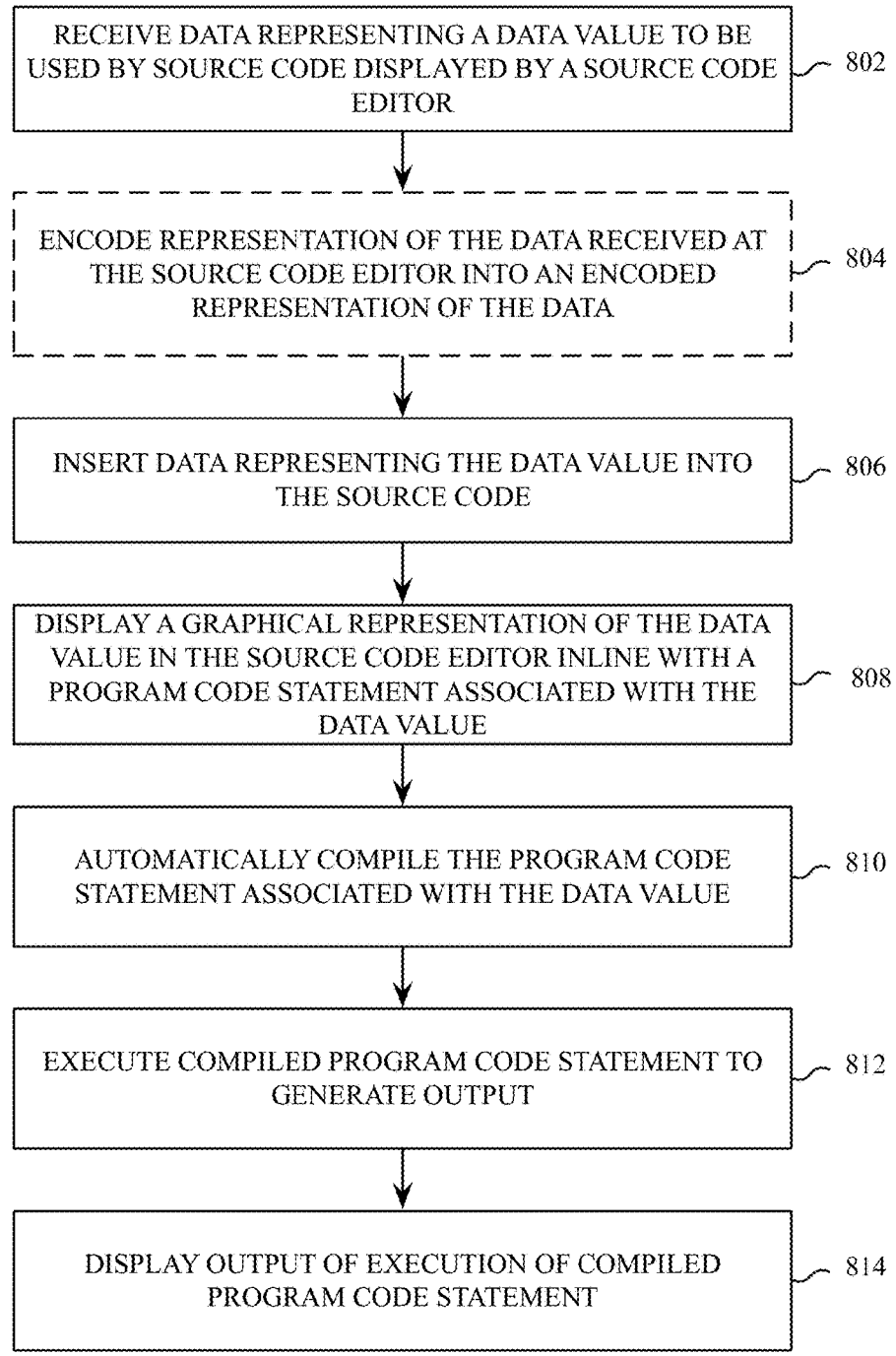
FIG. 8 is a flow diagram of a process of interactive application development using graphical literals, according to an embodiment.

FIG. 8 is a flow diagram of a process 800 of interactive application development using graphical literals, according to an embodiment. The process 800 can be a computer implemented process or method that is performed by a data processing system executing a code editor 108 or an IDE 104 including a source code editor as in FIG. 1. The source code editor or IDE can receive data representing a data value to be used by the source code displayed by the source code editor, as shown at block 802.

The data representing the data value can be received at block 802 via a drag-and-drop process in which a file including data to be used by a program statement of the source code is dragged into the region of the source code editor displaying the program statement and dropped at a location adjacent to the program statement. Alternatively, a user interface option of the source code editor can be used to select a file containing data to be used by the source code. The user interface option of the source code editor can also be used to insert non-file based literal data into the source code.

In one embodiment the process 800 includes to encode a representation of the data received at the source code editor into an encoded representation of the data, as shown at block 804. The encoded representation of the data can be a text representation or a different type of representation, such as an opaque data representation. The specific type of encoding can vary across embodiments. Some embodiments may exclude the encoding.

The process 800 additionally includes inserting data representing the data value into the source code, as shown at block 806. The data representing the value can be the encoded representation of the data created at block 804, or any other representation of the data value. At block 808, the process 800 can cause the display of a graphical representation of the data value in the source code editor inline with a program code statement associated with the data value. The program code statement associated with the data value can be any program statement that makes use of the data value, such as program code assigning the data value to a program constant, such as the program statements of code statement 1 through code statement 3 above. The graphical representation of the data value can vary according to the type of data represented. For example, the graphical representation can be a color value that represents color literal data or can be a scaled version of the image data of an image literal. Additionally, the graphical representation can be a video frame of a data file containing video data.

In one embodiment the process 800 includes to automatically compile the program code statement associated with the data value, as shown at block 810. In one embodiment the process 800 automatically compiles the source code is contingent on the occurrence of non-occurrence of certain events, such as the determination that a complete and correct program statement has been entered into the source code editor. Alternatively, compilation can occur automatically and periodically on an ongoing basis.

The process 800 can additionally cause the data processing system to execute the compiled program code statement to generate a result, as shown at block 812. The result of the program statement depends at least in part on the data value represented by the data received at block 802. For example, the result may be that a new program constant is created that contains the data value or that a characteristic of a program data value is modified based on the data value.

The process 800 can also cause the display of the result of the execution of the compiled program statement, as shown at block 814. The display of the result can be enabled or disabled based on the preferences of the developer. In one embodiment, displaying the result includes but is not limited to displaying data loaded from a file literal, such as text data loaded from a data file, image data loaded from an image file, or video data loaded from a video file. Displaying the result can also include playback of audio data loaded from an audio data file. Displaying the result can also include displaying image or video data modified based on color literal data.

Figure 9:
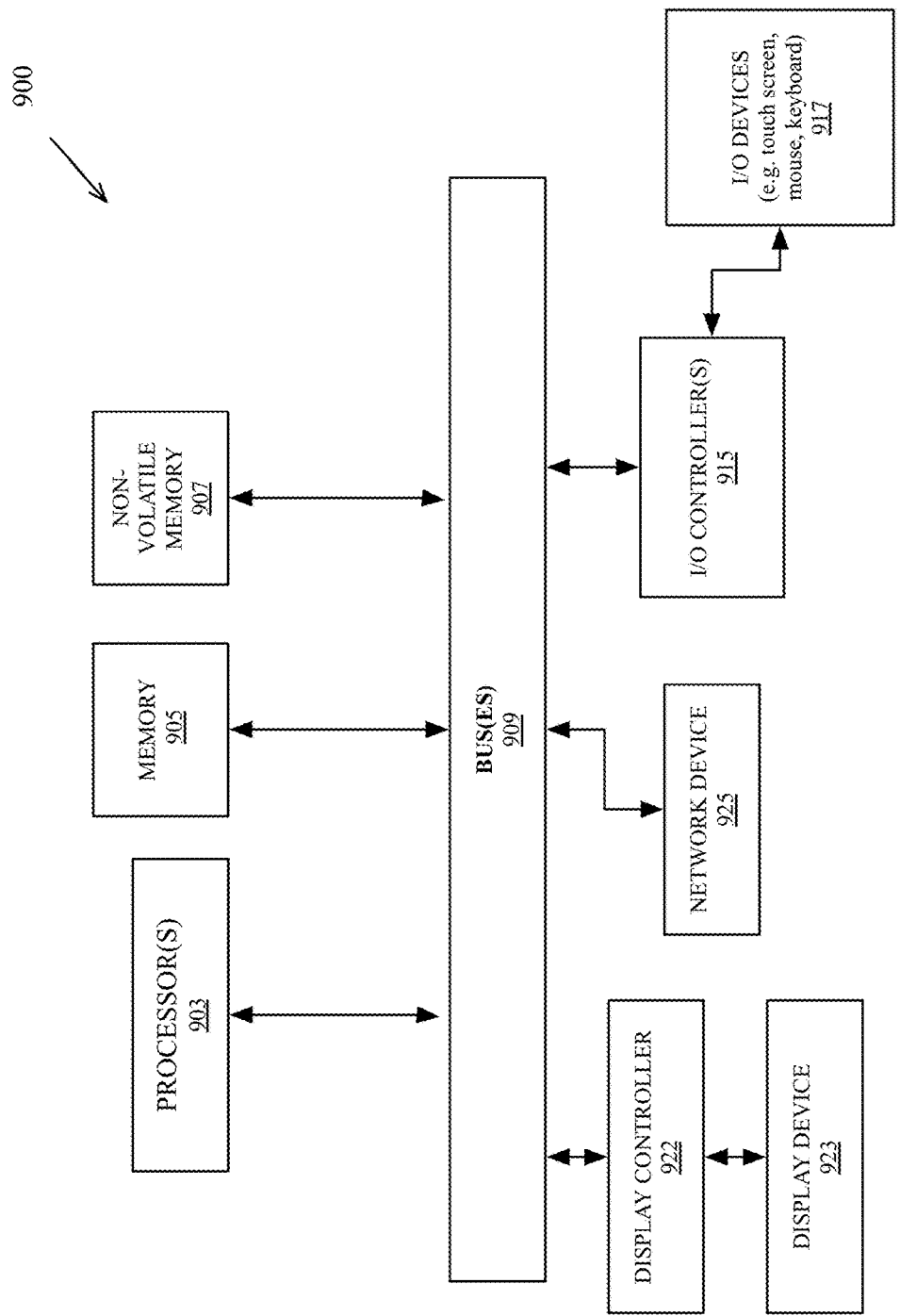
FIG. 9 is a block diagram of data processing system hardware, according to an embodiment.

FIG. 9 is a block diagram of a data processing system 900 according to an embodiment. Note that while FIG. 9 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown can also be used within the various embodiments.

The data processing system 900 includes one or more bus(es) 909 that serve to interconnect the various components of the system. One or more processor(s) 903 are coupled to the one or more bus(es) 909 as is known in the art. Memory 905 may be volatile DRAM or non-volatile RAM, such as NOR flash memory or other types of high-speed, non-volatile, execute-in-place memory. This memory can be coupled to the one or more bus(es) 909 using techniques known in the art. The data processing system 900 can also include explicitly non-volatile memory 907, such as data storage devices including one or more hard disk drives, flash memory devices or other types of memory systems that maintain data after power is removed from the system. The non-volatile memory 907 and the memory 905 can each couple to the one or more bus(es) 909 using known interfaces and connection techniques. A display controller 922 can couple to the one or more bus(es) 909 to receive display data, which can be displayed on a display device 923. In one embodiment the display device 923 includes an integrated touch input to provide a touch screen.

The data processing system 900 can also include one or more input/output (I/O) controllers 915 which provide interfaces for one or more I/O devices, such as one or more mice, touch screens, touch pads, joysticks, and other input devices including those known in the art and output devices (e.g. speakers). The input/output devices 917 are coupled through one or more I/O controllers 915 as is known in the art.

While the data processing system 900 illustrates the memory 905 and non-volatile memory 907 as coupled to the one or more buses directly, in one embodiment the non-volatile memory 907 can be remote from the data processing system 900, such as in a network storage device which is coupled to the data processing system through a network interface such as a modem, wireless LAN, or Ethernet interface. The bus(es) 909 can be connected to each other through various bridges, controllers and/or adapters as is well known in the art. In one embodiment the I/O controller 915 includes one or more of a USB (Universal Serial Bus) adapter for controlling USB peripherals or a Thunderbolt controller for controlling Thunderbolt peripherals. In one embodiment, one or more network device(s) 925 can be coupled to the bus(es) 909. The network device(s) 925 can be wired network devices (e.g., Ethernet) or wireless network devices (e.g., WI-FI, Bluetooth).

Figure 10:
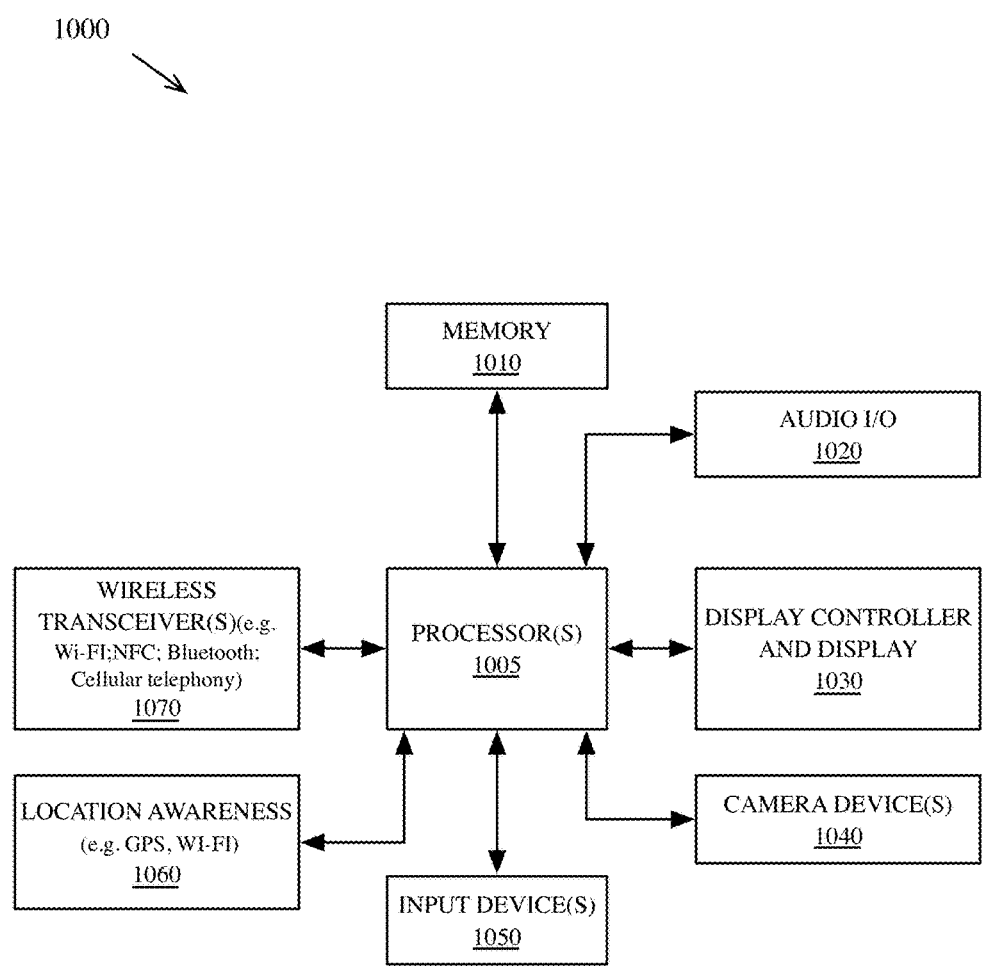
FIG. 10 is a block diagram of an additional data processing system, according to an embodiment.

FIG. 10 is a block diagram of an additional data processing system, according to an embodiment. The data processing system 1000 illustrated can include hardware components that are optimized for use in mobile or handheld devices and may be included within a system on a chip integrated circuit. One or more buses or interfaces that are not shown can be used to interconnect the various components, as known in the art. An electronic device constructed using the illustrated data processing system may include additional or fewer components than shown.

The data processing system 1000 can include a processing system having one or more processor(s) 1005, as well as memory 1010 for storing data and programs for execution. An audio I/O subsystem 1020 can also be included. The audio I/O subsystem 1020 can include a microphone and a speaker for telephone or video conferencing or for the recording and playback of music.

A display controller and display device 1030 can be included to provide a graphically displayed user interface and a wireless transceiver 1070 may be available to transmit and receive data via one or more wireless technologies, such as Wi-Fi, infrared, Bluetooth, or one or more variants of wireless radio technology. The system can contain one or more camera devices 1040 in both a front and rear facing configuration, though similarly configured systems each with only a front facing camera or rear facing camera can be one of many optimal configurations. The data processing system also includes one or more input devices 1050 to enable a user to provide input to the system. Input devices may include a keypad or keyboard, alone or in conjunction with a touch or multi touch panel that is overlaid on the display device 1030. The display device and touch panel can be adjusted in real time using factory-generated calibration data. The data processing system 1000 can also include a device for providing location awareness services 1060 via a Global Positioning System (GPS) device, WI-FI location awareness, or an equivalent service.

It will be apparent from this description that aspects of the present invention may be embodied, at least in part, in software. That is, the techniques may be carried out in a data processing system in response to its processor executing a sequence of instructions contained in a storage medium, such as embody a non-transitory machine-readable storage medium. In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Additionally various components described herein can be a means for performing the operations or functions described in accordance with an embodiment.

In one embodiment, non-transitory computer-readable medium stores instructions for graphically representing complex literal values inline within the source code editor of an Integrated Development Environment. In one embodiment the instructions cause a data processing system to perform a method comprising receiving data at a source code editor, the data representing a data value to be used by source code displayed by the source code editor; inserting the data representing the data value into the source code; and displaying a graphical representation of the data value in the source code editor, the graphical representation displayed within a program code statement associated with the data value.

In one embodiment the method additionally includes determining a data type for the data value to be used by the source code and displaying the graphical representation of the data value based on the data type. The data value can represent a data file having contents to be used by the source code as a literal data value and displaying the graphical representation of the data value includes displaying an icon representing the data file. The data file can be an image data file containing image data to be used by the source code as an image literal data value and the icon representing the data file is a scaled version of the image data of the image data file. The data file can also contain text data to be used by the source code as a string literal data value or multimedia data to be used by the source code as audio or video data.

In one embodiment the method additionally comprises encoding an identifier of the data file containing the literal data value and storing the identifier into the source code. The data value can represent color data to be used by the source code as a color literal value and the method can additionally comprise encoding a representation of the color literal value and storing the representation into the source code. In one embodiment the method additionally comprises automatically compiling the program statement associated with the data value after inserting the data representing the data value into the source code and displaying output of the program statement associated with the data value within the source code editor.

One embodiment provides for a system comprising one or more processors and a computer readable medium comprising instruction which, when executed by the one or more processors, cause the one or more processors to perform various operations. In one embodiment the operations include to execute a source code editor, the source code editor to display a source code listing of program code; receive data at the source code editor, the data representing a data value to be used by the program code; insert the data representing the data value into the source code; and display a graphical representation of the data value in the source code editor. The graphical representation can be displayed inline with a program code statement associated with the data value.

In one embodiment the one or more processors of the system are further configured to receive the data at the source code editor via a drag-and-drop process via a user interface provided on a display of the system, where the drag-and-drop process is to indicate a data file containing data to be used by the program code. The data file can contain data of a data type selected form a group comprising image data, and text data. The group can additionally include multimedia data. Content within the data file can be used as literal data by the program code. The data value can represent color data to be used by the source code as a color literal value. The color data can be inserted into the program code via a user interface provided by the source code editor and the graphical representation of the color literal data value can be a color represented by the color literal data value.

One embodiment provides for a non-transitory computer-readable medium with instructions stored therein, the instructions, when executed by a processor, cause the processor to perform operations, the operations comprising receiving data at a source code editor, the data representing a data value to be used by source code displayed by the source code editor; encoding an a representation of the data received at the source code editor into an encoded representation of the data; inserting the encoded representation of the data value into the source code; and displaying a graphical representation of the data value in the source code editor in place of the encoded representation, where the graphical representation is displayed within a program code statement associated with the data value. In one embodiment the operations additionally comprise automatically compiling the program code statement associated with the data value after inserting the encoded representation of the data value into the source code; and displaying output of the program statement associated with the data value within the source code editor.

It is contemplated that the invention includes all systems and methods that can be practiced from all suitable combinations of the various embodiments described herein. Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A computer implemented method comprising:
receiving literal data at a source code editor, the literal data representing a literal data value for use by source code displayed by the source code editor and the literal data includes a graphical representation of the literal data value;
inserting the literal data representing the literal data value into the source code;
displaying the graphical representation of the literal data value in the source code editor, the graphical representation displayed within a program code statement associated with the literal data value, wherein the graphical representation is an image and the graphical representation is generated by a front-end compiler;
automatically compiling, with a back-end compiler, the program code statement associated with the literal data value after inserting the literal data representing the literal data value into the source code; and
displaying output of the program code statement associated with the literal data value within the source code editor.

2. The computer implemented method as in claim 1, further comprising determining a data type for the literal data value to be used by the source code and displaying the graphical representation of the literal data value based on the data type.

3. The computer implemented method as in claim 2, wherein the literal data value represents a data file having contents to be used by the source code as the literal data value and displaying the graphical representation of the literal data value includes displaying an icon representing the data file.

4. The computer implemented method as in claim 3, wherein the data file is an image data file containing image data to be used by the source code as an image literal data value and the icon representing the data file is a scaled version of the image data of the image data file.

5. The computer implemented method as in claim 3, wherein the data file contains text data to be used by the source code as a string literal data value.

6. The computer implemented method as in claim 3, wherein the data file contains multimedia data to be used by the source code as audio or video data.

7. The computer implemented method as in claim 3, further comprising encoding an identifier of the data file containing the literal data value and storing the identifier within the source code.

8. The computer implemented method as in claim 1, wherein the literal data value further represents color data to be used by the source code as a color literal value.

9. The computer implemented method as in claim 8, further comprising encoding a representation of the color literal value and storing the representation within the source code.

10. A system comprising:
one or more processors; and
a non-transitory computer readable medium comprising instructions which, when executed by the one or more processors, cause the one or more processors to:
execute a source code editor, the source code editor to display a source code listing of program code;
receive literal data at the source code editor, the literal data representing a literal data value to be used by the program code and the literal data includes a graphical representation of the literal data value;

insert the literal data representing the literal data value into the source code;

display a graphical representation of the literal data value in the source code editor, the graphical representation displayed within a program code statement associated with the literal data value, wherein the graphical representation is an image and the graphical representation is generated by a front-end compiler;

automatically compile, with a back-end compiler, the program code statement associated with the literal data value after inserting the literal data representing the literal data value into the source code; and display output of the program code statement associated with the literal data value within the source code editor.

11. The system as in claim 10, wherein the one or more processors are further to receive the literal data at the source code editor via a drag-and-drop process via a user interface provided on a display of the system.

12. The system as in claim 11, wherein the drag-and-drop process is to indicate a data file containing data to be used by the program code.

13. The system as in claim 12, wherein the data file contains data of a data type selected form a group comprising image data, and text data.

14. The system as in claim 13, wherein the group additionally comprises multimedia data.

15. The system as in claim 14, wherein content of the data file is to be used as literal data by multiple program statements within the program code.

16. The system as in claim 10, wherein the literal data value further represents color data to be used by the source code as a color literal value, the color data inserted into the program code via a user interface provided by the source code editor.

17. The system as in claim 16, wherein the graphical representation of the color literal value is a color represented by the color literal value.

18. A non-transitory computer-readable medium with instructions stored therein, the instructions, when executed by a processor, cause the processor to perform operations, the operations comprising:

receiving literal data at a source code editor, the literal data representing a data value to be used by source code displayed by the source code editor and the literal data includes a graphical representation of the literal data value;

encoding a representation of the literal data received at the source code editor into an encoded representation of the data value;

inserting the encoded representation of the data value into the source code;

displaying a graphical representation of the data value in the source code editor in place of the encoded representation, the graphical representation displayed within a program code statement associated with the data value, wherein the graphical representation is an image and the graphical representation is generated by a front-end compiler;

automatically compiling, with a back-end compiler, the program code statement associated with the literal data value after inserting the literal data representing the literal data value into the source code; and displaying output of the program code statement associated with the literal data value within the source code editor.

* * * * *